April 30, 1940. J. GAISER 2,198,869

TRACTOR PLOW

Filed Nov. 9, 1939 2 Sheets-Sheet 1

INVENTOR.
John Gaiser
BY Frederick W. Cotterman
ATTORNEY.

April 30, 1940.  J. GAISER  2,198,869
TRACTOR PLOW
Filed Nov. 9, 1939  2 Sheets-Sheet 2
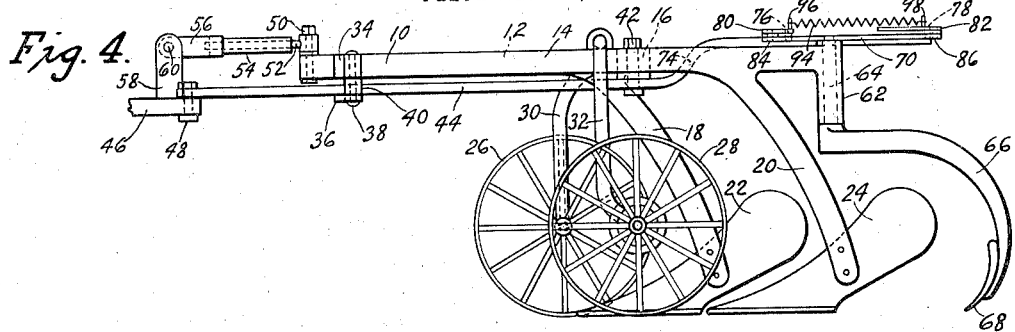
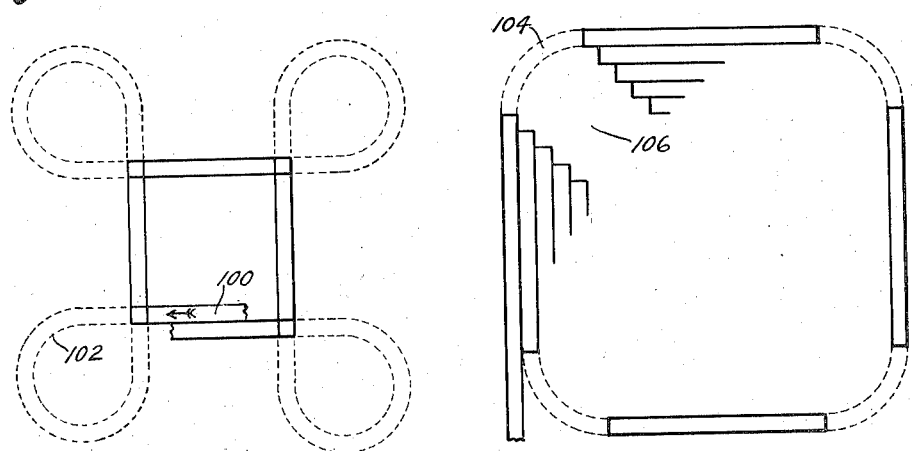
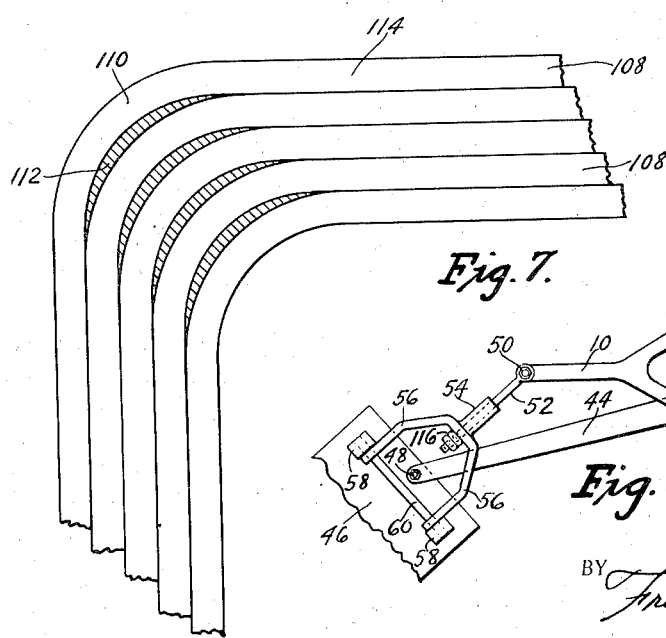
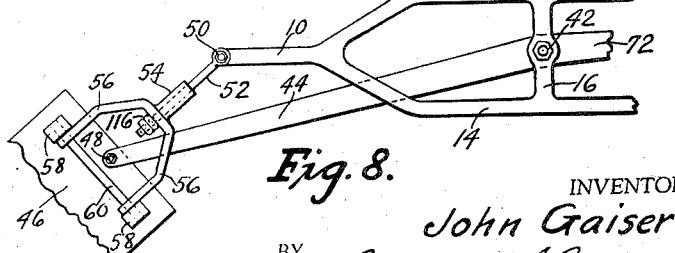
INVENTOR.
John Gaiser
BY Frederick W. Cotterman
ATTORNEY.

Patented Apr. 30, 1940

2,198,869

UNITED STATES PATENT OFFICE 2,198,869

TRACTOR PLOW

John Gaiser, near Centerville, Ohio

Application November 9, 1939, Serial No. 303,619

18 Claims. (Cl. 97—105)

This invention relates to plows and more particularly to that type of plow which is adapted to be drawn by a tractor.

One of the greatest defects in commercially available tractor plows is in the hitch, for while tractors have been developed which will make substantially a right angle turn at the corner of a field, the plows used, necessarily have the front end of the beam hingedly connected to the rear of the tractor, whereby, when the tractor makes a right angle turn, the plow is dragged diagonally across the corner practically out of control.

Due to this defect, operators of tractor plows raise the plow out of the ground during the period of time that the tractor is turning the corner whereby that part of each field at the turns must be plowed subsequently by a second operation.

It is therefore an object of this invention to provide a plow which so operates on the turns that an entire field may be plowed without raising the plow out of the ground.

More particularly, an object of the invention is to provide a positively controlled hitch between the tractor and the plow which will cause the plow to make a definite short radius turn each time the tractor draws it around a corner.

When a rectangular field is plowed by making a continuous furrow, with each turn around the last, with the same radius at the corners, it will be found that a wider swath is required on the turns than on the straightaway, and it is therefore another object of this invention to provide means for momentarily increasing the width of the swath being plowed as the plow passes around the turns at the corners.

Since the process of plowing involves cutting loose a strip of soil approximately a foot wide and half as deep and turning it over, it is well known that the entire surface of a field is moved laterally about a foot with each plowing, and good practice therefore consists in plowing a given field one time by beginning at the center and making right turns at the corners, and the next time by beginning at the outside and making left turns at the corners, whereby the surface is moved alternately toward and away from the center of the field.

It is therefore another object of this invention to so construct and arrange the embodiment thereof that all of its functions will be operative whether it is being employed for right or for left hand plowing.

That these and other objects and meritorious features are attained in the embodiment hereinafter disclosed will become more evident as the invention is described in greater detail, reference being had to the drawings, wherein, Fig. 1 is a top plan view of the plow when on the straight away.

Fig. 4 is a side elevation of the plow.

Figs. 5 and 6 show diagrammatically two of the conventional methods of meeting the difficulty encountered at the corners of a field being plowed by a tractor plow.

Fig. 7 shows diagrammatically how a plow which is designed to cut a given swath on the straightaway will cut an insufficient swath when cuts of the same radius are taken, one within the other, at the corners.

Fig. 8 shows an alternate form of hitch which may be substituted for that shown in Figs. 1 to 4.

Similar numerals refer to similar parts throughout the several views.

Construction

Figure 1:
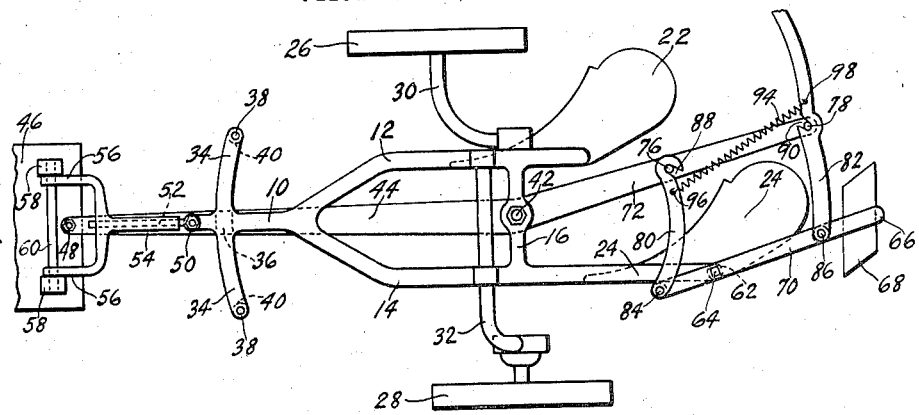

Referring now to the drawings, which disclose a plow of the twin bottom type, a beam 10 is divided into a right limb 12 and a somewhat longer left limb 14, the two limbs being joined by a cross brace 16. Yokes 18 and 20 (see Fig. 4) carry the right and left bottoms 22 and 24 respectively. Bottoms 22 and 24 for clearness are shown as if of single piece construction, but it will be understood that they are built up of separate parts including shoe, share, mold board, etc., as in common practice. A furrow wheel 26 and a land wheel 28 are carried on axles 30 and 32 respectively.

Near the front end of the beam 10 are laterally extending arcuate wings 34, below which a plate 36 of corresponding arcuate contour is held by rivets 38 which pass through the wings and plate with spacing collars 40 therebetween, thereby leaving a space between the wings and plate equal to the height of the collars.

Pivotally supported on the underside of the cross brace 16 by a hinge bolt 42 is the draw bar 44, the front end of which extends through the space between the wings 34 and the plate 36, the lateral swinging movement of the front end of the draw bar about the pivot 42 being therefore limited by the collars 40.

The extreme front end of the draw bar 44 is pivotally held on the hitch plate 46 of a tractor by a hinge bolt 48 which may be loose enough in the hole in the end of the draw bar to allow a limited degree of flexibility when the tractor or plow is passing over a hill or through a hollow. The draw bar 44 is, however, swingable principally in a horizontal plane.

Hinged to the front end of the beam by a bolt 50 is a bar 52 which is also adapted to swing in a horizontal plane. Bar 52 may be called a guide bar since it determines the direction of movement of the plow with respect to that of the tractor. The guide bar 52 is slidably fitted into a guide sleeve 54. The front end of the guide sleeve 54 is secured to the tractor in any suitable manner, the main object being to so secure it that it will not be able to swing in a horizontal plane with respect to the tractor, but must always have its axis lengthwise with the tractor no matter which way the tractor turns.

As a suitable means for securing the guide sleeve 54 to the tractor hitch plate 46, in the embodiment shown, there is provided a pair of widely spaced apart prongs 56 which extend from the forward end of the guide sleeve, a pair of ears 58 which extend upwardly from the hitch plate, and a pin 60 which extends through both the ears 58 and prongs 56. This fastening therefore provides the desirable flexibility for plowing rolling ground, yet positively prevents swinging movement in a horizontal plane of the guide sleeve 54 with respect to the tractor.

In the modification shown in Fig. 8, the guide bar 52 is threaded at its free end and the nuts 116 may be adjusted, then one jammed against the other to limit withdrawal of the guide bar 52 from the sleeve 54.

The nuts 116 therefore act as a means to limit swinging movement of the guide bar 52, which has the same effect on the hitch as a whole as the wings 34 and collars 40 which limit swinging movement of the drawbar 44. The wings 34, plate 36, and collars 40 are therefore eliminated in the modification Fig. 7.

The left limb 14 of the beam 10, at its extreme rear end, has a depending hub 62 (see Fig. 4) which is bored to rotatably contain the shank 64 of a swinging yoke 66 which carries an auxiliary bottom 68. The auxiliary bottom 68 normally follows behind the left bottom 24 on the straightaway but is adapted to swing out when the plow rounds a corner. The desirability of this swinging movement will be more apparent when the operation of the plow is hereinafter described.

The upper end of the shank 64 is squared where it extends from the upper end of the hub 62, and a tiller 70 is firmly secured to the squared end so that the yoke 66 may be swung by turning the tiller. That part of the tiller which extends forwardly from the shank 64 is shorter than that part which extends rearwardly for a reason which will later appear.

That portion of the drawbar 44 which extends rearwardly from the hinge bolt 42, is deflected to the right as at 72, Fig. 1, and also upward as at 74, Fig. 4. Tiller operating pins 76 and 78 extend upwardly from the top surface of the drawbar. Front and rear tiller operating links 80 and 82 are hinged by pins 84 and 86 to the front and rear ends respectively of the tiller 70.

The front tiller operating link 80 has a notch 88 which fits freely over the pin 76, while the rear tiller operating link 82 has a notch 90 which fits freely over the pin 78. An extended spring 94 hooked over pins 96 and 98 draws the free ends of the links 80 and 82 toward each other.

The notch 88 is so slanted that when the rear end of the drawbar swings right, its pin 76 may pull the front end of the tiller at 84 inward, but when the drawbar swings left it may exert only a limited force to push point 84 outward, otherwise the pin 76 will cam itself out of the notch 88 against the resistance of the spring 94.

The notch 90 is so slanted that when the rear end of the drawbar swings left, its pin 78 may push the rear end of the tiller at 86 outward, but when the drawbar swings right it may exert only limited force to pull the point 86 inward, otherwise the pin 78 will cam itself out of the notch 90 against the resistance of the spring 94.

Figure 2:
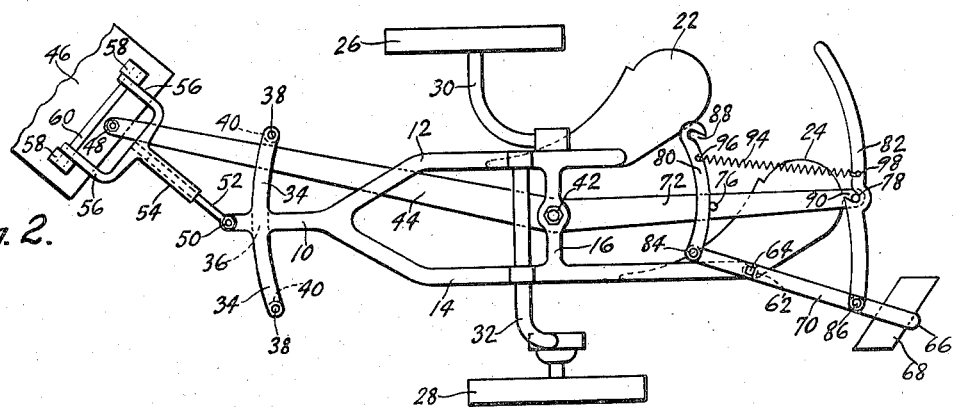
Fig. 2 is a top plan view of the plow when rounding the corner of a field by a right hand turn, that is, clockwise.
Figure 3:
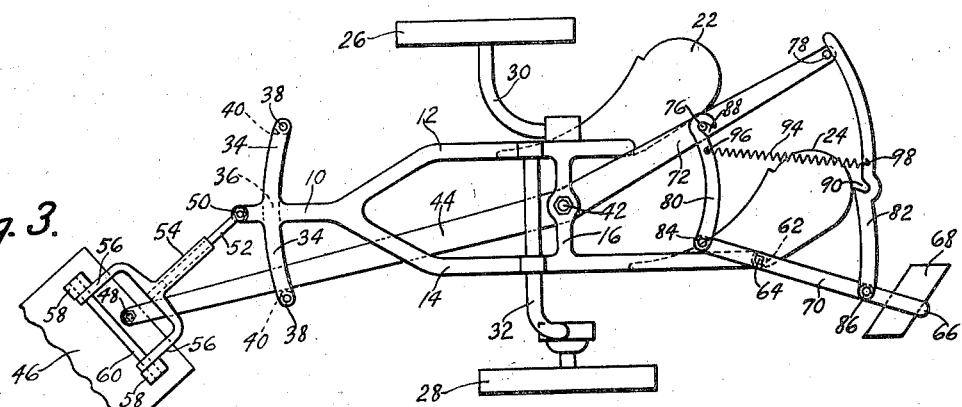
Fig. 3 is a top plan view of the plow when rounding the corner of a field by a left hand turn, that is, anti-clockwise.

It will now be evident that no matter whether the drawbar 44 swings right or left, the tiller 70 will in either case be so turned as to extend the auxiliary bottom 68 outward as in Figs. 2 and 3, but that whenever the drawbar is straight as in Fig. 1, the bottom 68 will be drawn in and held behind the left bottom 24.

It will also be evident that when the tractor is making a right or left turn as in Figs. 2 or 3, the front end of the beam 10 at 50 is held to the straightaway by the guide rod 52 and guide sleeve 54 until the tractor has made a considerable portion of its turn before the plow itself starts around its relatively short radius at the corner.

Operation

In plowing a field with a tractor plow of conventional design, a perfectly square or rectangular plot may be plowed by the method illustrated in Fig. 5. This is done by plowing a swath 100 from the center of a field outward and making loops 102 at the corners. While making these loops, the plow bottoms are raised out of the ground. This method is satisfactory for large tracts because the loop circumference is small in proportion to the straightaway distances.

Another considerably used method is illustrated in Fig. 6 where the plow bottom is raised out of the ground when making a turn 104. Since, however, the radius 104 required for making a turn is as large when near the center of a field as when near the outside, the part of a field which is left unplowed takes the form of a strip 106 which extends from each corner to the center.

Except in large tracts therefore, the extra labor involved in plowing these strips 106 is almost as extensive as that of plowing the original portion.

Fig. 7 shows, diagrammatically, a part of five rounds 108 plowed with the improved short turn plow herein disclosed. Where, however, successive swaths, each having the same turning radius 110 are cut, one within the next, at the corners, there is always a crescent shaped strip 112 between each cut which remains unplowed.

The short radius 110 can not possibly be plowed by conventional methods and equipment, nor can the crescent shaped strips 112 be plowed thereby. The improved plow herein shown overcomes these shortcomings as follows:

As long as the tractor is following a straightaway 114, Fig. 7, the plow remains as in Fig. 1, with the beam 10, the drawbar 44, the guide bar 52, and the guide sleeve 54, all in alignment. The rear part 72 of the drawbar is now at such an angle that the notches 88 and 90 are both over their respective pins 76 and 78, whereby the tiller 70 holds the auxiliary bottom 68 in back of the bottom 24.

When plowing right hand and the tractor reaches a corner, and starts turning as in Fig. 2, the natural tendency of the landside of a plow bottom is to follow the straightaway. This is not only permitted by the swinging of the drawbar 44 to the right but is positively enforced by the lateral displacement of the guidebar 52 which holds the nose of the beam in the straightaway.

If a plow of the ordinary type was hitched in the ordinary way to the hitch plate 46, the plow would already have started to cut across the corner, for its centerline would be that of the drawbar 44.

At the same time that the drawbar 44 swings right as in Fig. 2 until arrested by a collar 40, its rear end 72 swings left, whereby the pin 78, engaging the notch 99, turns the tiller 70 and swings the yoke 66 with its auxiliary bottom 68 far enough to the outside to cut away the crescent 112, Fig. 7.

When the rear end of the tiller swings outward, the front end necessarily swings inward, whereby the pin 76 is cammed out of the notch 88 and rides along the convex edge of the link.

When plowing left hand and the tractor reaches a corner and starts turning as in Fig. 3, the drawbar 44 swings left and the guide bar 52 holds the nose of the plow beam to the straightaway. The movement to the right of the rear end 72 of the drawbar pulls the front end 84 of the tiller inward by the pin 76 and link 80, at the same time camming the pin 78 out of the slot 90 and sliding it along the concave edge of the link 82. The auxiliary bottom 68 has therefore been swung outwardly, both when the plow turned right and when it turned left.

For a farmer who always plows right hand, as in Fig. 2, the link 80 may be removed and the end of the spring 94 be then removed from the pin 96 and hooked over the pin 76. Conversely, for a farmer who always plows left hand as in Fig. 3, the link 82 may be removed and the end of the spring be then removed from the pin 98 and hooked over the pin 78.

It will be further understood that the means for raising the plow out of the ground will preferably be included in any embodiment of this invention, although for clearness of illustration it is not shown in the drawings since it forms no part of this invention.

To further assist those skilled in the art to build a plow from this disclosure, it may be added that if it is desired to make a plow which will turn a still shorter radius, this may be done by extending the point 50 of the beam forward and shortening the front end of the drawbar so as to move the point 48 rearward. This will allow the tractor to make a greater portion of its turn before the plow begins turning. A similar result may be had by lengthening the laterally extending wings 34.

The pivotal point 42 of the drawbar is shown as being midway between the points of the bottoms 22 and 24, but this point may be shifted somewhat to attain a larger triangle between points 42, 48 and 50 which would adapt the plow to a shorter turning radius.

The auxiliary bottom 68 must be made to swing outwardly a definite amount if it is to just cut away the crescent 112, Fig. 7. Assuming that 22 and 24 are twelve inch bottoms so that the swath 108, Fig. 7, is twenty four inches wide, and that the corners are full ninety degree turns, the width of the crescent 112 at its maximum width point will be secant 45 degrees times the width of the swath, minus the width of the swath. With a twenty four inch swath the crescent width will then be $24 \times 1.4142 - 24 = 9.94$ inches or in even figures, 10 inches. From this, a rule may be deducted whereby the auxiliary bottom is always extended five inches for each foot in width of the swath. This is true independently of whether the radius 110, Fig. 7, is shorter or longer.

The side rake of the auxiliary bottom may best be arrived at experimentally. If it is too steep it will run out, tending to pull the back end of the plow to the left, while if it is too straight across it will act as a rudder and tend to throw the back end of the plow to the right. A balanced condition may be had by proper adjustment of this angle.

Throughout this description, where the terms right and left are used, it is intended to mean to the right or left of a man standing behind the plow looking forward.

While a single embodiment only has been shown and described, many equivalents, variants, or modifications of the invention could be proposed, as for instance in the fastening which holds the guide sleeve 54 axially aligned with the tractor or in the linkage whereby the auxiliary bottom is always swung outwardly by the drawbar whether the drawbar swings right or left. Insofar, therefore, as such equivalents are not found in the prior art, it is the intent to embrace them in the following claims.

I claim:

1. In a tractor plow, hitching means for hitching the tractor to the plow, said hitching means being adapted to shift when said tractor turns from a straight course, a plow bottom, an auxiliary plow bottom normally aligned with the first said plow bottom but shiftable laterally out of said alignment, and means connecting said hitching means to said auxiliary plow bottom whereby the shifting of said hitching means shifts said auxiliary plow bottom.

2. In a tractor plow, hitching means for pivotally connecting the tractor to the plow, whereby said hitching means may swing in a horizontal plane with respect to said plow when said tractor turns from a straight course, a plow bottom, an auxiliary plow bottom normally aligned with the first said plow bottom but shiftable laterally out of said alignment, and linkage connecting said hitching means to said auxiliary plow bottom whereby the swinging of said swinging means shifts said auxiliary plow bottom.

3. In a tractor plow, a plow beam, a drawbar hinged to said beam for connecting the tractor to the plow, whereby said drawbar may swing about said hinge in a horizontal plane with respect to said beam when said tractor turns from a straight path, a plow bottom, a hinged auxiliary plow bottom normally in alignment with the first said plow bottom but swingable on its hinge out of said alignment, and linkage connecting said drawbar to said hinged bottom whereby the swinging of said drawbar swings said hinged bottom out of said alignment.

4. In a tractor plow, a plow beam, a plow bottom, a drawbar for connecting the tractor to the plow, hinged to said beam above the point of said bottom and hinged to the tractor, whereby said drawbar may swing about said hinges in a horizontal plane with respect to said beam when said tractor turns from a straight line, means to limit said swinging movement, an auxiliary plow bottom on said plow normally in alignment with the first said bottom but shiftable laterally out of said alignment, and means operative by said swinging movement for laterally shifting said auxiliary bottom.

5. In a tractor plow, a plow beam, a plow bottom, a drawbar hinged to said beam above said bottom and adapted for hinged connection to the tractor, whereby said drawbar may swing in a horizontal plane with respect to said plow and said tractor when said tractor turns from a straight path, means to limit said swinging movement, an auxiliary plow bottom hinged to said beam and normally swung on said hinge into alignment with the first said bottom but adapted to be swung out of said alignment to widen the swath being plowed by the first said bottom, and means operative by the swinging movement of said drawbar for swinging said auxiliary bottom out of said alignment.

6. A tractor plow comprising, a beam, a plow bottom, hitching means including a drawbar hinged to said beam above said bottom and adapted for hinged connection to the tractor, whereby said drawbar may swing in a horizontal plane with respect to said plow and tractor when said tractor turns from a straight path, means to limit the swinging movement of the drawbar with respect to the beam, an auxiliary plow bottom hinged to the plow and normally swung on its hinge into a position behind the first said bottom but adapted to be swung laterally from said position to widen the swath being plowed, and means operative by movement of the hitching means for laterally swinging said auxiliary bottom.

7. A tractor plow comprising, a plow beam, a plow bottom, hitching means including a drawbar hinged to said beam and adapted for hinged connection to the tractor, whereby the drawbar may be swung in one or the other direction in a horizontal plane with respect to said plow and tractor when said tractor turns to the right or left, an auxiliary plow bottom normally in alignment with the first said plow bottom but adapted to be swung in one direction out of said alignment to widen the swath being plowed, and means connecting the hitching means to the auxiliary bottom adapted to swing said auxiliary bottom in said one direction by swinging of said drawbar in either direction.

8. A tractor plow comprising, a beam, a fixed bottom, an auxiliary bottom in back of the fixed bottom and normally in alignment therewith but adapted to swing laterally out of said alignment to widen the swath being cut, a drawbar adapted at its front end for connection to the tractor, hinged intermediate its ends to the beam above the fixed bottom and extending rearwardly from the hinge to provide an operating means for swinging the auxiliary bottom, whereby said drawbar may swing in a horizontal plane in one or the other direction when the tractor turns right or left, and means connecting the rearwardly extending portion of the drawbar to the auxiliary bottom to swing the auxiliary bottom laterally.

9. A tractor plow comprising, a beam, a fixed bottom, an auxiliary bottom in back of the fixed bottom and normally aligned therewith, but adapted to swing laterally in one direction out of said alignment to widen the swath being cut, a drawbar adapted at its front end for hitching to the tractor and hinged intermediate its ends to the beam, whereby said drawbar may swing in a horizontal plane in one or the other direction as the tractor turns right or left, said drawbar extending rearwardly from its hinge to provide an operating means for swinging the auxiliary bottom, a shank upon which the auxiliary bottom swings, a tiller on said shank extending both forwardly and rearwardly thereof, front and rear links hinged respectively to the front and rear ends of the tiller, hooks on the free ends of the links, and hook engaging means on the drawbar, the hook on the front link being adapted to be engaged by its engaging means when the drawbar moves one direction to pull the front end of the tiller inwardly and the hook on the rear link being adapted to be engaged by its engaging means when the drawbar moves the other direction to push the rear end of the tiller outwardly, whereby the auxiliary bottom is swung outwardly by either right or left turning of the tractor.

10. The structure defined in claim 9 wherein the hooks are formed by diagonal notches cut in the edges of the links which face each other, and the engaging means are pins extending from the drawbar into the notches with an extension spring drawing the links toward each other, whereby the front link may apply positive force to pull the front end of the tiller inwardly but yielding force to push it outwardly, and the rear link may apply positive force to push the rear end of the tiller outwardly but yielding force to pull it inwardly.

11. In a tractor plow, a beam, beam guiding means comprising a guide bar so hinged to the front end of the beam that the guide bar may swing in a horizontal plane with respect to the beam, and guide member so secured to the rear end of a tractor as to prevent the guide bar from swinging in a horizontal plane with respect to the tractor, said bar being endwise slidable in said member, and a drawbar hinged farther rearward on said beam than said guide bar so as to allow the drawbar to swing in a horizontal plane with respect to the beam the front end of said drawbar being so hinged to said tractor as to allow the drawbar to swing in a horizontal plane with respect to the tractor.

12. The structure defined in claim 11 wherein the guide member is hinged to the rear end of the tractor to swing in a vertical plane.

13. The structure defined in claim 11 with means to limit the endwise sliding movement of the guide bar in the guide member.

14. In a tractor plow, a beam, swingable hitching means including a guide bar so hinged to the front end of the beam that the guide bar may swing in a horizontal plane with respect to the beam, a guide member so held to the rear end of the tractor that the guide member is prevented from swinging in a horizontal plane with respect to the tractor, said bar being endwise slidable in said member, a drawbar hinged further rearward on said beam than said guide bar and hinged at its front end to the tractor so that the drawbar may swing in a horizontal plane both with respect to the plow and tractor, a plow bottom rigidly fixed to said beam, and an auxiliary plow bottom normally in back of the rigid plow bottom but swingable laterally from behind the fixed bottom by the swinging movement of the said hitching means.

15. The structure defined in claim 14 wherein the first said plow bottom is carried on a rigid yoke and the auxiliary plow bottom is carried on a yoke swingable on a vertical shank, with a tiller on said shank for swinging said yoke, and means connecting the tiller to a point on the swingable hitching means, whereby said auxiliary bottom is swung when said hitching means swings.

16. In a tractor plow, means for hitching the tractor to the plow, a plow bottom, a second plow bottom normally aligned with the first, means whereby the second plow bottom may shift out of alignment with the first, and means operative by turning movement of said tractor with respect to the plow to shift said second bottom out of said alignment.

17. In a tractor plow, a plow bottom, an auxiliary cutting tool normally held in an inoperative position with respect to the first said bottom, but adapted to be shifted to an operative position alongside the first said bottom to widen the swath being cut by said first bottom, hitching means for connecting the plow to a tractor including a member adapted to shift with respect to the plow when the tractor turns from a straight course, and means operative by the shifting of the said shiftable member of said hitching means to shift said auxiliary bottom to operative position.

18. In a tractor plow, a beam, a plow bottom, hitching means including a drawbar having its rear end hinged back from the front of the beam near the plow bottom and its front end hinged to the tractor, whereby said drawbar may swing in a horizontal plane with respect to said beam and said tractor, means to limit the swinging movement of the drawbar with respect to the beam, a separate cutter carried by said beam and normally drawn along in the swath already plowed but adapted upon turning a corner to swing out into the unplowed ground to add to the width of the swath at the corners.

JOHN GAISER.